United States Patent [19]

Humphrey

[11] Patent Number: 4,852,767

[45] Date of Patent: Aug. 1, 1989

[54] VENDING MACHINE DISPENSER

[75] Inventor: Dallas Humphrey, Plymouth, Minn.

[73] Assignee: Edina Technical Products, Inc., Eden Prairie, Minn.

[21] Appl. No.: 163,550

[22] Filed: Mar. 3, 1988

[51] Int. Cl.[4] ........................ G07F 11/08; B65G 57/00

[52] U.S. Cl. ........................................ 221/241; 221/67; 221/277

[58] Field of Search .................. 221/115, 118, 67, 241, 221/251, 258, 266, 277, 281, 312 R; 211/59.2, 74; 312/45; 222/305, 306, 282, 283, 268, 267

[56] References Cited

U.S. PATENT DOCUMENTS

| | | | |
|---|---|---|---|
| 1,450,058 | 3/1923 | Allen | 221/241 |
| 1,721,137 | 7/1929 | Schmidt | 222/288 |
| 1,981,272 | 11/1934 | Kuhn et al. | 221/312 R X |
| 4,298,138 | 11/1981 | Oden | 221/115 |
| 4,454,961 | 6/1984 | Childers et al. | 221/266 |
| 4,569,463 | 2/1986 | Pellegrino | 222/288 X |

FOREIGN PATENT DOCUMENTS

| | | | |
|---|---|---|---|
| 86/07575 | 12/1986 | PCT Int'l Appl. | 221/266 |

*Primary Examiner*—Joseph J. Rolla
*Assistant Examiner*—Mona C. Beegle
*Attorney, Agent, or Firm*—Peterson, Wicks, Nemer & Kamrath

[57] ABSTRACT

A dispenser according to preferred teachings of the present invention is disclosed for use in a machine for vending generally cylindrical articles. The dispenser includes a generally cylindrical cradle rotatably mounted below the outlet of a storage enclosure. The enclosure is dimensioned to hold and store a plurality of articles in a serpentine column. The enclosure includes a guiding baffle for directing the bottom article into the outlet of the enclosure and an unweighting baffle which reduces the weight placed on the articles in the enclosure below the unweighting baffle and thus the weight transferred to the cradle by the article in the outlet. The cradle can then be rotated between a first position with an opening of a cavity formed in the cradle aligned with the outlet of the article storage enclosure for receiving an article from the enclosure and a second position with the cradle blocking the passage of articles through the outlet of the storage enclosure and with the opening of the cavity allowing the article to fall from the cavity through the opening. In its most preferred form, the cradle is formed as two generally equal semicylindrical halves which can be easily fabricated by injection molding and which are particularly adapted for interchanging for varying size articles to be vended.

18 Claims, 2 Drawing Sheets

VENDING MACHINE DISPENSER

BACKGROUND

The present invention relates generally to vending machines, particularly to machines for vending generally cylindrical articles, and particularly to dispensers for use in machines for vending generally cylindrical articles.

Since their advent, vending machines have proven to be an important method of vending products As vending machines are often located at remote locations and are often serviced only periodically, a need has arisen for improved dispensers for use in vending machines which have relatively few moving parts, which are of simple design which is easy to fabricate and assemble, which are relatively trouble free, which are versatile in allowing articles of varying sizes to be vended, and which are relatively safe in preventing unauthorized access to the articles to be vended. Further, a need has arisen for dispensers of relatively low cost to expand the number of market locations which can support the use of vending machines.

SUMMARY

The present invention solves these needs and other problems in machines for vending generally cylindrical articles, by providing a dispenser including a cradle in association with an article storage enclosure. The cradle is positionable such as by being rotatably mounted in the preferred form between a first position with an opening of a cavity formed in the cradle aligned with an outlet of the article storage enclosure and a second position with the cradle blocking the passage of articles through the outlet of the storage enclosure and with the opening of the cavity allowing the article to fall from the cavity through the opening.

It is thus an object of the present invention to provide a novel dispenser for use in vending machines.

It is further an object of the present invention to provide such a novel dispenser for use in machines vending generally cylindrical articles.

It is further an object of the present invention to provide such a novel dispenser which has few moving parts.

It is further an object of the present invention to provide such a novel dispenser which is of simple design.

It is further an object of the present invention to provide such a novel dispenser which is easy to fabricate.

It is further an object of the present invention to provide such a novel dispenser which is easy to assemble.

It is further an object of the present invention to provide such a novel dispenser which is relatively trouble free.

It is further an object of the present invention to provide such a novel dispenser which is adaptable to vend articles of varying size.

It is further an object of the present invention to provide such a novel dispenser which is safe from unauthorized access to the articles to be vended.

It is further an object of the present invention to provide such a novel dispenser which is relatively inexpensive.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
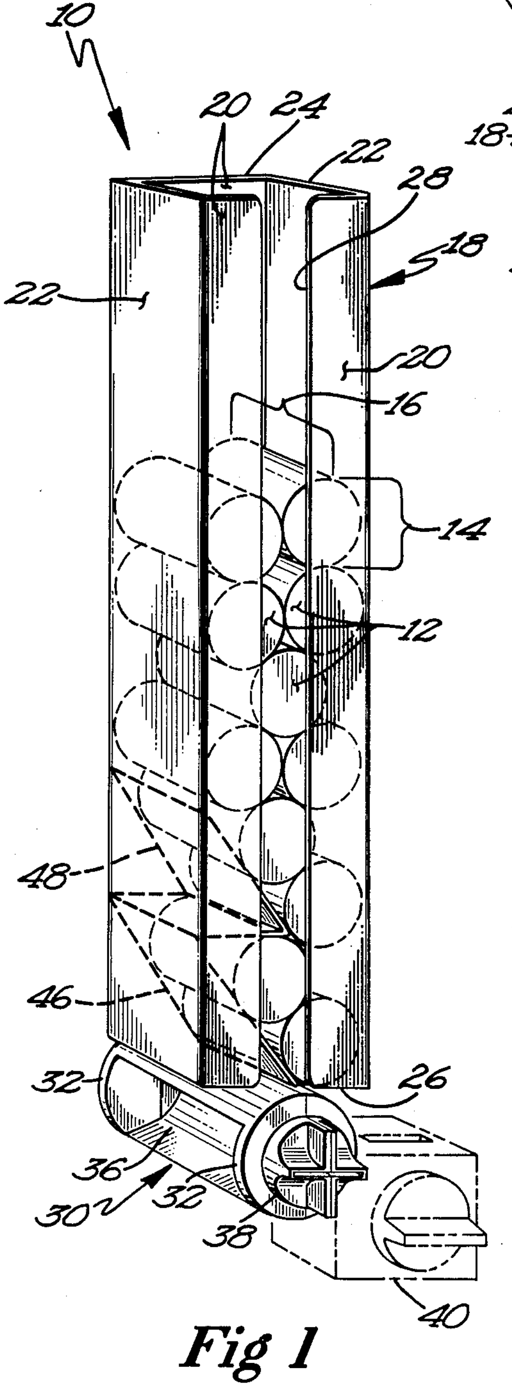
FIG. 1 shows a perspective view of a dispenser for use in a vending machine according to the preferred teachings of the present invention, with a coin mechanism of the vending machine being shown in phantom.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inner", "outer", "inside", "outside", "length", "width", "depth", "end", "side", "front", "rear", and similar terms are used herein, it should be understood that these terms have reference only to the structure shown in the drawings as it would appear to a person viewing the drawings and are utilized only to facilitate describing the invention.

DESCRIPTION

A dispenser according to the preferred teachings of the present invention for use in a vending machine is shown in the drawings and is generally designated 10. Dispenser 10 in its most preferred form dispenses generally cylindrical articles 12 such as soda pop cans, soda pop bottles, juice cans, and the like. Articles 12 have a length 16 and include a cylindrical outside surface having a diameter 14 and an axis.

Dispenser 10 generally includes a storage enclosure 18 for holding and storing a plurality of articles 12 and in the preferred form for holding a plurality of articles 12 stacked on their cylindrical outside surfaces with their axes being parallel, and in the most preferred form for holding a plurality of articles 12 in a serpentine column. Specifically, enclosure 18 comprises a hollow parallelepiped including parallel front and rear walls 20 arranged perpendicular to and joining parallel first and second side walls 22, a generally open top 24, and a generally open bottom 26. In the most preferred form, open bottom 26 forms the outlet of enclosure 18 of a shape and size allowing one of the plurality of articles 12 to pass therethrough. Walls 20 and 22 are closed against removal of articles 12 from enclosure 18 therethrough. In the most preferred form, front wall 20 includes elongated opening 28 having a width less than diameter 14 of articles 12 to allow viewing of articles 12 within enclosure 18 and to allow loading of articles 12 through top 24 into enclosure 18 without dropping articles 12. The length of enclosure 18 between walls 20 is generally equal to or larger than length 16 of articles 12. The width of enclosure 18 between walls 22 is at least equal to diameter 14 of articles 12, in the preferred embodiment is larger than diameter 14 of articles 12, and in the most preferred form is slightly less than twice diameter 14 of articles 12.

Dispenser 10 further includes a cradle 30 positioned adjacent open bottom 26 for dispensing a single article 12 from the serpentine column of articles 12 within enclosure 18. Cradle 30 in the preferred embodiment is generally cylindrical in configuration and shape having an axis, and includes first and second end walls 32 and a cylindrical side wall 34. The diameter of cradle 30 is greater than diameter 14 of article 12 and the length of cradle 30 between end walls 32 is at least slightly larger than length 16 of article 12 and is slightly less than the length of enclosure 18 between walls 20. A cavity 36 having an opening formed in sidewall 34 is provided in cradle 30 of a size for receiving a single article 12 with the single article 12 located in cavity 36 being inside the radial extent of cradle 30. In the most preferred form, cavity 36 has a width and a depth generally equal to but slightly larger than diameter 14 of article 12 and in the most preferred form has a generally U-shape cross section including a generally semicircular bottom of a diameter generally equal to but slightly larger than diameter 14 of article 12 and straight, parallel sides spaced generally equal to but slightly larger than diameter 14 of article 12.

Cradle 30 is rotatably mounted about its axis below bottom 26 of enclosure 18, with the axis of cradle 30 being parallel to the axes of articles 12 within enclosure 18. Specifically, in the preferred form, annular shoulders 38 are formed on end walls 32 for rotatable receipt in openings formed in the vending machine such as in extensions of walls 20 beyond bottom 26. Flange bushings 42 may be provided as bearings between shoulders 38 and the openings in the vending machine. Provisions 44 may be provided for rotating cradle 30 such as rectangular ears shown which may be interconnected to a coin mechanism 40 shown in phantom in FIG. 1 or other like rotational device utilized in vending machines such as but not limited to single rotation electric motors or the like.

Enclosure 18 may include a guide baffle 46 which partially closes bottom 26 to a width generally equal to but slightly larger than diameter 14 of article 12 and generally equal to and aligned with the width of the opening of cavity 36. Thus, baffle 46 guides the bottom article 12 of the serpentine column of articles 12 toward cavity 36 of cradle 30. It should be appreciated that guide baffle 46 can take a variety of forms including extending from a single wall 22 as shown or from both walls 22. Enclosure 18 may further include a baffle 48 for reducing the weight placed on the bottom article 12 of the serpentine column of articles 12 by the remaining articles 12 in that column. In the most preferred form, baffle 48 is an incline extending downwardly from side wall 22 between front and rear walls 20 at an acute angle for abutting with an article 12 in the serpentine column of articles 12 of enclosure 18 above the bottom article 12 adjacent bottom 26 of enclosure 18. Due to the serpentine nature of the column of articles 12, the weight of the column of articles 12 will generally be transferred to pushing the article 12 adjacent baffle 48 against side wall 22 and baffle 48 such that the articles 12 of the serpentine column of articles 12 below baffle 48 are not susceptible to the full weight of the column.

It can then be appreciated that dispenser 10 according to the teachings of the present invention can be easily adapted to dispense varying sized articles 12. Specifically, by the selection of a cradle 30 having the appropriate size cavity 36 and/or by the adjustment of baffles 46 and 48 according to the size of the particular article 12 to be dispensed.

Figure 3:
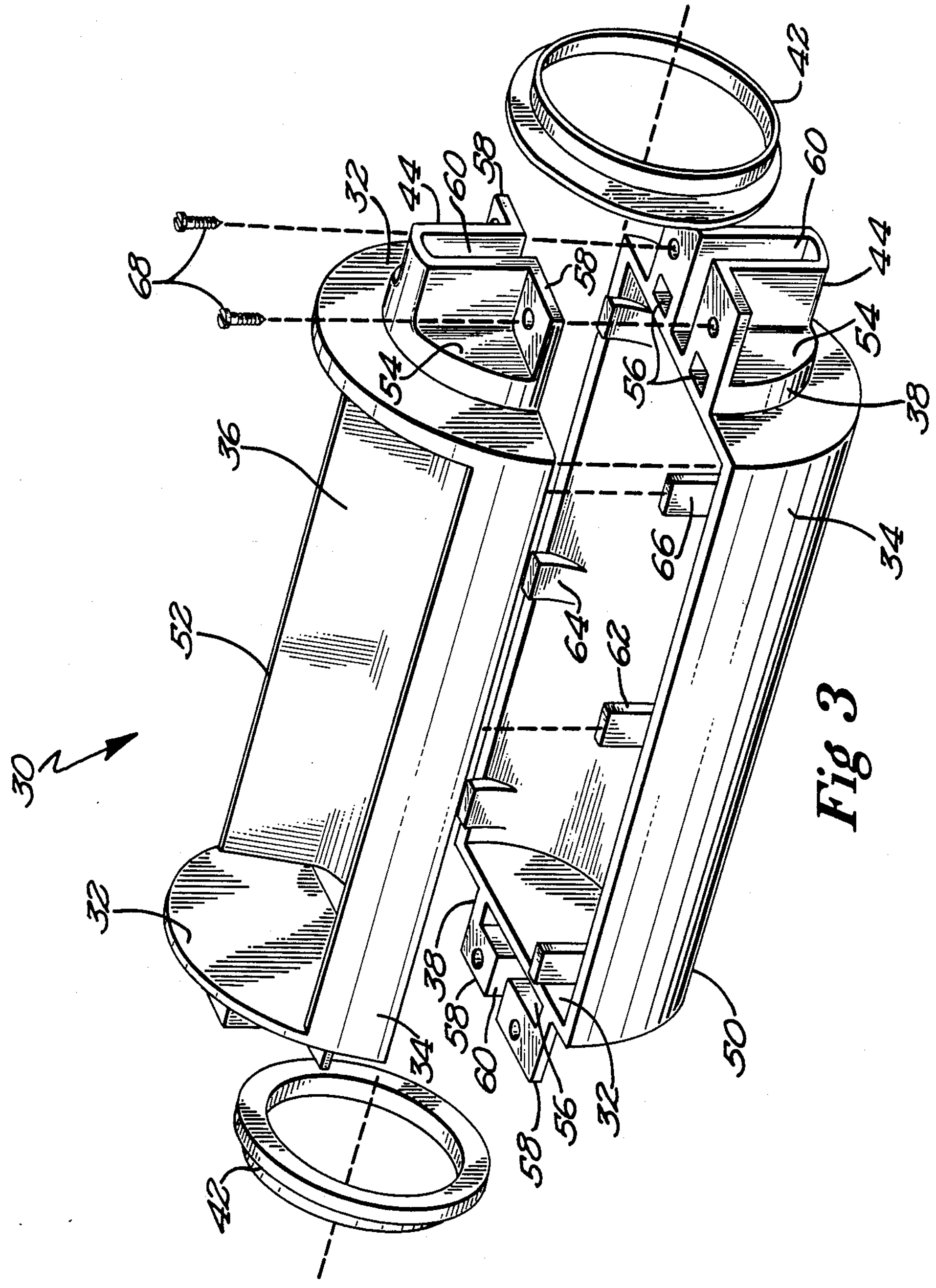
FIG. 3,shows an exploded perspective view of a preferred form of a cradle for the dispenser of FIG. 1.

In the most preferred form, cradle 30 according to the teachings of the present invention is of a unique and advantageous construction which can be easily fabricated such as by injection molding and which is particularly adapted for interchanging for varying size articles 12. Specifically, cradle 30 is generally axially divided into two generally equal semicylindrical halves 50 and 52. Specifically, halves 50 and 52 include semicircular end walls 32, semicylindrical shoulders 38, generally semicircular ends 54 located generally parallel to and on opposite sides of shoulders 38 than end walls 32 forming generally semicylindrical spaces 56 between end walls 32 and ends 54, and axially extending mounting flanges 58 extending from the free, diameter end of semicircular ends 54 along a diameter of cradle 30. In the most preferred form, provisions 44 upstand from and divide semicircular ends 54 and mounting flanges 58 into two generally identical pieces separated by spaces 60. In the preferred embodiment, provisions 44 of each half has a generally U-shaped cross section. The bottom or central portion of the U-shaped cross section of provisions 44 is arcuate and contiguous with shoulder 38. Semicircular end 54 is divided by and terminates in the first and second, spaced, parallel legs of the U-shaped cross section of provisions 44. Similarly, mounting flanges 58 are divided by and terminate in the first and second, spaced, parallel legs of the U-shaped cross section of provisions 44. In the most preferred form, provisions 44 are provided on both ends of cradle 30 for symmetry and in the most preferred form, the side walls of provisions 44 on the driven end of cradle 30 extend through semicylindrical space 56 dividing it into three pieces as shown in the right side of FIG. 3.

Half 50 includes positioning bosses 62 and 64 extending from the inner surfaces of semicylindrical side wall 34. In the most preferred form, bosses 62 are elongated and have generally arcuate outer surfaces 66 extending from side wall 34. In the most preferred form, bosses 64 are generally short and have the shape of a solid, right parallelepiped. In assembly, side wall 34 of half 52 may be brought to engage and ride down on surfaces 66 of bosses 62 and then half 52 can be pivoted in a hinge-like motion such that the opposite side wall 34 of half 52 engage the corresponding side wall 34 of half 50 with bosses 64 abutting the interior of side wall 34 of half 52 to prevent radial movement of halves 50 and 52. Halves 50 and 52 can then be interconnected such as by screws 68 extending through mounting flanges 58. It can then be appreciated that the outer surface of side wall 34 of halves 50 and 52 is continuous and smooth without breaks or other interruptions.

In the preferred embodiment, cavity 36 is formed in side wall 34 of half 52 and is not in any way formed in half 50. It can then be appreciated that half 52 can be formed with different sized cavities 36 corresponding to the size of article 12 desired to be dispensed. Half 50 can then be combined with the desired half 52 to create the complete cradle 30 having the desired cavity 36.

It can further be appreciated by persons skilled in injection formation that due to the semicylindrical configuration of side walls 34 of halves 50 and 52 and due to spaces 56 and 60, halves 50 and 52 can be relatively easily fabricated such as by injection plastic molding.

Figure 2B:
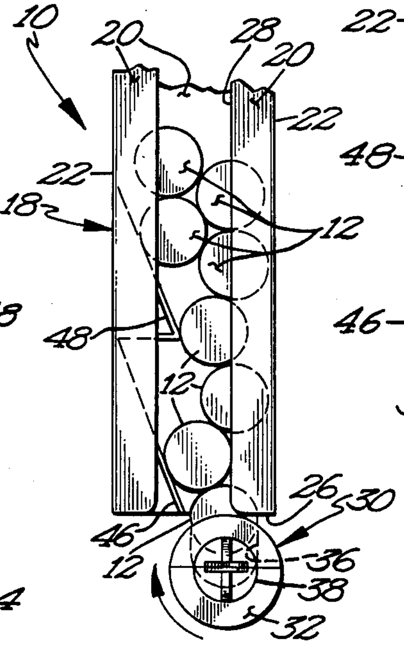
FIGS. 2A, 2B, and 2C show front plan views of the dispenser of FIG. 1 illustrating positions of the cradle thereof.
Figure 2A:
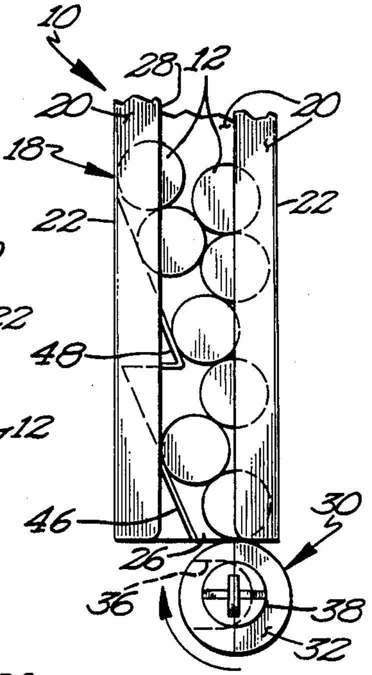

Now that the basic construction of dispenser 10 according to the preferred teachings of the present invention has been set forth. the operation and subtle features of dispenser 10 can be explained and appreciated. Specifically, it will be assumed that cradle 30 is rotatably positioned in a position such as shown in FIG. 2A such that the opening of cavity 36 is not aligned with open bottom 26 and with side wall 34 of cradle 30 blocking passage of articles 12 through open bottom 26. It can be appreciated that the bottom article 12 of the serpentine column of articles 12 is guided into bottom 26 by baffle 46 such that it rests upon and is supported by side wall 34 of cradle 30. When it is desired to dispense an article 12 from enclosure 18, cradle 30 is rotated such as by its interconnection to a coin mechanism 40 which is manually turned by the person who wishes to purchase article 12. Due to baffle 48, the entire weight of the serpentine column of articles 12 is not subjected to side wall 34 of cradle 30, but rather side wall 34 is generally subjected only to the weight of the articles 12 below baffle 48. Thus, cradle 30 may be easily rotated in the openings of the vending machine. In the most preferred form, the bottom article 12 may in fact rotate about its axis due to the engagement of its sidewall with side wall 34 of cradle 30 to prevent article 12 from hanging up in enclosure 18 and to help its entry into cavity 36 of cradle 30. When cradle 30 is rotated into a first position such that the opening of cavity 36 aligns itself with article 12 guided in bottom 26 of enclosure 18, the bottom article 12 falls into and is received within cavity 36 of cradle 30 as shown in FIG. 2B. Due to the sizing of cavity 36, the next article 12 behind the article 12 in cavity 36 remains outside of cavity 36 such that cradle 30 may be continued to be rotated such that side wall 34 moves below the next article 12 and closes open bottom 26 of enclosure 18. It can then be appreciated that this "next" article 12 becomes the bottom article 12 in enclosure 18 for the next purchase.

Figure 2C:
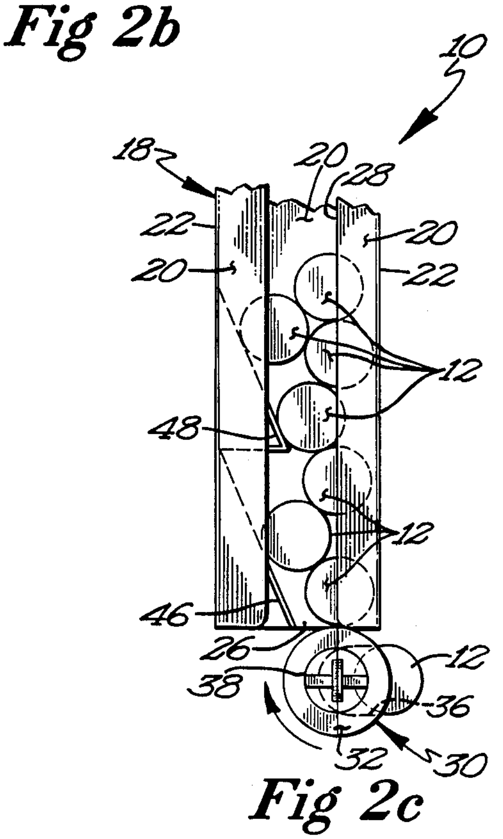

Upon continued rotation of cradle 30, cavity 36 may be positioned in a second position as shown in FIG. 2C such that article 12 can fall therefrom under gravity for delivery to the customer. For example, article 12 may fall on an incline in the vending machine and roll toward the front of the vending machine for access by the customer. It can be appreciated that in the second position, side wall 34 blocks open bottom 26 for preventing the passage of articles 12 therethrough.

Although only a single dispenser 10 has been described, it can be appreciated that a single vending machine may include multiple dispensers 10 according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In a machine for vending generally cylindrical articles, a dispenser comprising, in combination: means for storing a plurality of the articles, with the storing means having an outlet of a size and shape allowing one of the plurality of articles to pass therethrough; a cradle positioned adjacent the outlet of the storing means, with the cradle being generally cylindrical in shape and having an axis; a cavity formed in the cradle for receiving the article to be ended, with the cavity having an opening; and means for rotatably mounting the cradle below the outlet of the storing means about the axis for positioning the cradle between a first position with the opening of the cavity aligned with the outlet of the storing means for receiving the article to be vended from the storing means and a second position with the cradle blocking the passage of the articles through the outlet of the storing means and with the opening of the cavity allowing the article to fall from the cavity through the opening, wherein the cradle comprises, in combination: first and second semicylindrical halves, with the cavity located in the second semicylindrical half allowing first semicylindrical halves of identical construction to be utilized with second semicylindrical halves having cavities of different sizes to dispense articles of corresponding sizes allowing the cradle to be interchanged in the dispenser for dispensing varying sized articles.

2. The dispenser of claim 1 wherein the article includes a cylindrical outside surface having an axis and a diameter; wherein the article has a length; wherein the plurality of articles are stacked on their cylindrical outside surfaces; wherein the rotatably mounting means rotatably mounts the cradle with the axis of the cradle parallel to the axes of the outside surfaces of the articles; and wherein the cavity has a length generally equal to but slightly larger than the length of the article and has a depth and a width generally equal to but slightly larger than the diameter of the outside surface of the article.

3. The dispenser of claim 2 wherein the storing means comprises an enclosure having a length generally equal to but slightly larger than the length of the article and has a width greater than the diameter of the outside surface of the article, with the plurality of articles arranged in a serpentine column in the enclosure; and wherein the enclosure includes a baffle for directing one of the plurality cf articles to be vended into the outlet of the storing means.

4. The dispenser of claim 3 further comprising, in combination: means for reducing the weight placed on the article adjacent the outlet of the storing means by the remaining articles in the storing means.

5. The dispenser of claim 4 wherein the weight reducing means comprises an inclined baffle within the enclosure for abutting with an article in the storing means above the article adjacent the outlet of the storing means.

6. The dispenser of claim 1 wherein the rotatably mounting means comprises annular shoulders formed on the cradle for receipt in openings formed in the vending machine.

7. The dispenser of claim 6 further comprising, in combination: flange bushings receiving on the annular shoulders of the cradle and received in the openings formed in the vending machine, with the flange bushings acting as bearings between the annular shoulders and the openings of the vending machine.

8. The dispenser of claim 6 further comprising, in combination: means attached to the cradle for interconnection to a rotational device of the vending machine.

9. The dispenser of claim 8 wherein the interconnection means comprises a rectangular ear formed on the cradle and extending axially beyond the annular shoulder.

10. The dispenser of claim 1 wherein the cradle includes first and second generally circular end walls and a generally cylindrical side wall, with the opening of the cavity formed in the generally cylindrical side wall; and wherein the rotatably mounting means comprises annular shoulders extending axially from the end walls for receipt in openings formed in the vending machine.

11. The dispenser of claim 10 wherein the first and second semicylindrical halves further comprise, in combination: a semicircular end integrally formed on the annular shoulder opposite the end walls to form a generally semicylindrical space between the semicircular ends and the end walls for ease of fabrication by injection molding.

12. The dispenser of claim 11 wherein the first and second semicylindrical halves further comprise, in combination: ears extending axially from the semicircular end for interconnection to a rotational device of the vending machine, with the ears having a generally U-shaped cross section, with the ears including a central portion and first and second spaced, parallel legs extending therefrom, with the central portion being accurate and contiguous with the annular shoulder and with the semicircular end being divided by and terminating in the first and second legs of the ear for ease of fabrication by injection molding.

13. The dispenser of claim 12 wherein the first and second semicylindrical halves further comprise, in combination: axially extending mounting flanges extending from the semicircular end; and means for securing the axially extending mounting flanges of the first and second semicylindrical halves together.

14. The dispenser of claim 13 wherein the axially extending mounting flanges of the first and second semicylindrical halves are divided by and terminate in the first and second legs of the ear for ease of fabrication by injection molding.

15. The dispenser of claim 11 wherein the first and second semicylindrical halves further comprise, in combination: axially extending mounting flanges extending from the semicircular end; and means for securing the axially extending mounting flanges of the first and second semicylindrical halves together.

16. The dispenser of claim 15 wherein the first semicylindrical half includes positioning bosses extending from the inner surface of the semicylindrical side wall for engaging the inner surface of the semicylindrical side wall of the second semicylindrical half.

17. The dispenser of claim 1 further comprising, in combination: means for reducing the weight placed on the article adjacent the outlet of the storing means by the remaining articles in the storing means.

18. The dispenser of claim 17 wherein the weight reducing means comprises an inclined baffle for abutting with an article in the storing means above the article adjacent the outlet of the storing means.

* * * * *